United States Patent
Lehmann (10) Patent No.: US 10,012,560 B2
(45) Date of Patent: Jul. 3, 2018

(54) MULTISTAGE CONTAINER LEAK TESTING

(75) Inventor: Martin Lehmann, Wohlen (CH)

(73) Assignee: WILCO AG, Wohlen (CH)

( * ) Notice: Subject to any disclaimer, the term of this patent is extended or adjusted under 35 U.S.C. 154(b) by 359 days.

(21) Appl. No.: 14/405,863

(22) PCT Filed: Jun. 8, 2012

(86) PCT No.: PCT/EP2012/060921
§ 371 (c)(1),
(2), (4) Date: Dec. 5, 2014

(87) PCT Pub. No.: WO2013/182251
PCT Pub. Date: Dec. 12, 2013

(65) Prior Publication Data
US 2015/0177093 A1    Jun. 25, 2015

(51) Int. Cl.
*G01M 3/04*    (2006.01)
*G01M 3/20*    (2006.01)
(Continued)

(52) U.S. Cl.
CPC ............ *G01M 3/202* (2013.01); *G01M 3/00* (2013.01); *G01M 3/205* (2013.01); *G01M 3/229* (2013.01); *G01M 3/329* (2013.01)

(58) Field of Classification Search
CPC .......... G01M 3/04; G01M 3/16; G01M 3/202; G01M 3/229; G01M 3/26; G01M 3/32; G01M 3/3281; G01M 3/329; G01M 3/38
(Continued)

(56) References Cited

U.S. PATENT DOCUMENTS 3,751,972 A *  8/1973  Hass ..................... G01M 3/363
                                                    73/45.4
5,907,093 A    5/1999  Lehmann
(Continued)

FOREIGN PATENT DOCUMENTS

EP         0 791 814 A2    8/1997
EP         0 791 814 A2    8/1999
(Continued)

OTHER PUBLICATIONS

International Preliminary Report on Patentability with Written Opinion, dated Dec. 9, 2014 of PCT/EP/2012/060921, Inter. Filing Date: Jun. 8, 2012.
(Continued)

*Primary Examiner* — Benjamin Schmitt
(74) *Attorney, Agent, or Firm* — Oliff PLC (57) ABSTRACT

A coarse-fine two-stage leak detection is carried out on sealed, filled containers loaded into container holders or "pucks". Failure of the first, coarse leak detection stage, e.g. a pressure-course or impedance or laser-absorption based leak detection stage, causes containers to be rejected together with their corresponding container holders. These are then separated, and the container holder is cleaned and dried before being returned to the system. Any leaking product from inside a grossly leaking container is thus retained within the container holder, thus reducing contamination of subsequent containers and their container holders, preventing such contamination from reaching the fine leak detection stage, e.g. a mass-spectrometer-based leak detection stage.

15 Claims, 4 Drawing Sheets

(51) Int. Cl.
*G01M 3/22* (2006.01)
*G01M 3/32* (2006.01)
*G01M 3/00* (2006.01)

(58) Field of Classification Search
USPC .......... 73/40, 41, 41.3, 45, 45.4, 49.2, 49.3; 702/51
See application file for complete search history.

(56) References Cited

U.S. PATENT DOCUMENTS

| | | | |
|---|---|---|---|
| 6,082,184 | A | 7/2000 | Lehmann |
| 6,185,987 | B1 | 2/2001 | Lehmann |
| 6,202,477 | B1 | 3/2001 | Lehmann |
| 6,305,215 | B2 | 10/2001 | Lehmann |
| 6,439,033 | B1 | 8/2002 | Lehmann |
| 6,446,493 | B1 | 9/2002 | Lehmann |
| 6,575,016 | B2 | 6/2003 | Lehmann |
| 6,829,936 | B2 | 12/2004 | Lehmann |
| 7,000,456 | B2 | 2/2006 | Lehmann |
| 2012/0037795 | A1 | 2/2012 | Lehmann |

FOREIGN PATENT DOCUMENTS

| | | |
|---|---|---|
| JP | S64-015626 A | 1/1989 |
| JP | H07-325004 A | 12/1995 |
| JP | 2000-121482 A | 4/2000 |
| WO | WO 2011/012730 A2 | 2/2011 |

OTHER PUBLICATIONS

International Search Report and Written Opinion dated Aug. 28, 2013; International Application No. PCT/EP2012/060921; International Filing Date: Jun. 8, 2012.

* cited by examiner

MULTISTAGE CONTAINER LEAK TESTING

RELATED APPLICATION

This application is a U.S. national stage application under 35 U.S.C. § 371 of International Application Number PCT/EP2012/060921 filed Jun. 8, 2012.

TECHNICAL FIELD

The present invention relates to a multistage method of leak testing closed and filled containers, and a corresponding system for carrying out the method.

BACKGROUND AND SUMMARY

It is important to detect leaking containers in a production line to prevent imperfectly-packaged products from reaching the end consumer, with potentially harmful or dangerous consequences: for instance, a food or pharmaceutical product can become contaminated if the packaging container is compromised by leak, or the product can leak out and be lost. By "product" we understand the contents of a container, such as food or drink, medicine, chemicals, etc.

Over the years, various leak detection systems and methods have been developed, one of the more sensitive of which was developed by the Applicant and is disclosed in WO 2011/012730, the contents of which is herein incorporated by reference. The system and method disclosed in this document describes leak detection based on mass spectrometry, and is thus capable of detecting extremely fine leaks. Since mass spectrometers are costly and sensitive apparata that work with a high vacuum, a coarse leak may introduce a large amount of product into the mass spectrometer, requiring delicate cleaning or reconditioning and/or damaging the mass spectrometer. To protect the mass spectrometer from these risks, a coarse leak detection is carried out before the mass spectrometry leak detection, a container failing the coarse leak detection being rejected and not being subject to the mass spectrometry-based leak detection. This coarse leak detection may be for instance a pressure-course method such as those disclosed in U.S. Pat. No. 5,907,093, U.S. Pat. No. 6,082,184, U.S. Pat. No. 6,202,477, U.S. Pat. No. 6,305,215, U.S. Pat. No. 6,439,033, U.S. Pat. No. 6,575,016, U.S. Pat. No. 6,829,936, U.S. Pat. No. 7,000,456 and further related patent documents, all of the same applicant as the present application. Alternatively, the coarse leak detection may be for instance an impedance-based method such as disclosed in U.S. Pat. No. 6,446,493 or U.S. Pat. No. 6,185,987. Further alternatively, the coarse leak detection may be a laser absorption method such as an infrared and/or visible-spectrum and/or ultraviolet laser absorption method. The contents of all of the above-mentioned documents are likewise herein incorporated by reference with respect specifically to leak detection.

Although the first, coarse leak detection step serves to prevent grossly-leaking containers from entering the mass spectrometer leak detection step, it is still possible that a grossly-leaking container can contaminate the testing chamber in which the coarse leak detection step is carried out to such a degree that subsequent containers are contaminated e.g. with liquid product and/or water, requiring the contaminated chamber to be removed, or bypassed in the ongoing in-line processing, and must subsequently be fully decontaminated. This contamination will then be introduced into the testing chamber for the mass spectrometry testing step, affecting the test results and possibly contaminating the mass spectrometer itself with the negative consequences described above.

An object of the present invention is therefore to overcome at least one of the above-mentioned disadvantages of the prior art.

This object is attained by a method of leak testing closed, filled containers in which the containers are loaded into corresponding container holders. The thus-loaded containers are then subjected in their corresponding container holders to a first leak detection step, and any containers detected as leaking based on the first leak detection step are rejected together with their corresponding container holders (i.e. the corresponding container holder and the container are rejected as a unit). Subsequently, the containers not previously identified as leaking are subjected to a second leak detection step in their corresponding container holders. By rejecting the grossly-leaking containers together with their corresponding container holder after the first leak detection step (which would typically be a coarse leak detection step for detecting grossly-leaking containers), any product released from the interior of the leaking containers will be retained within the container holders and thereby will not contaminate the environment of the first leak detection step, preventing cross-contamination to other containers or container holders from causing contamination to reach the environment of the second leak detection step (which would typically be a fine leak detection step for detecting finally-leaking containers), thereby contaminating and compromising it.

In an embodiment, which may be combined with any subsequent embodiment unless in contradiction, the method further comprises the step of rejecting containers identified as leaking in the second leak detection step in their corresponding container holders (i.e. the corresponding container holder and the container are rejected as a unit), which enables easy segregation of container holders that may have been contaminated by a leaking container in the second leak detection step.

In an alternative embodiment, which may be combined with any subsequent embodiment unless in contradiction, the method further comprises unloading containers that were subject to the second leak detection step from their respective container holders, then subsequently rejecting the unloaded containers identified as leaking in the second leak detection step. This results in a simple method for rejection of leaking containers with minimal human intervention.

In an embodiment, which may be combined with any preceding or subsequent embodiment unless in contradiction, the containers rejected based on the first leak detection step are unloaded from the corresponding container holders, which are then cleaned. Optionally, container holders rejected based on the second leak detection step are also cleaned. This cleaning removes the contamination and permits the re-use of the container holders.

In an embodiment, which may be combined with any preceding or subsequent embodiment unless in contradiction, the cleaned container holders are reused, preventing loss of container holders.

In an embodiment, which may be combined with any preceding or subsequent embodiment unless in contradiction, the method comprises a step of retaining within the container holders any product escaping from a container during the first detection step, ensuring that the leaking product does not escape from the container holders and contaminate testing equipment.

In an embodiment, which may be combined with any preceding or subsequent embodiment unless in contradiction, each container holder is adapted to receive a single container, resulting in simple and cheap container holders and enabling each container to be tested individually, thereby preventing non-leaking containers from being rejected together with leaking ones.

In an embodiment, which may be combined with any preceding or subsequent embodiment unless in contradiction, each container holder is adapted to receive a plurality of containers, this plurality of containers simultaneously undergoing each respective leak detection step. This permits parallel testing of multiple containers thereby speeding testing throughput, however rejection of one leaking container entails rejection of all the containers in the same container holder, requiring disposal of all of these containers or intervention to identify which container or containers leaked.

In an embodiment, which may be combined with any preceding or subsequent embodiment unless in contradiction, the first leak detection step is a pressure-course-based or an impedance-based or a laser-absorption-based leak detection step, and the second leak detection step is a mass-spectrometry-based leak detection step. This permits the less sensitive pressure-course-based or impedance-based or laser-absorption-based leak detection step to protect the apparatus required for the extremely sensitive mass-spectrometry-based leak detection step.

Furthermore, the invention relates to a method of manufacturing unleaky closed containers filled with a product, comprising manufacturing untested filled containers, testing these containers by any of the above-mentioned methods, and accepting containers which have not been identified as leaking as being unleaky containers. Thereby, unleaky containers are manufactured.

The object of the invention is also attained by an apparatus for leak testing closed and filled containers comprising:
- a loading arrangement for loading containers into container holders;
- a conveyor arrangement for inline conveying a plurality of said container holders towards, through and from a first leak testing station, said first leak testing station comprising a first leak testing arrangement operationally connectable to a surrounding of each of said containers;
- a first rejection mechanism operated based on an output of the first leak testing arrangement and arranged to reject container holders containing a container determined as leaking by the first leak testing arrangement (i.e. the corresponding container holder and the container are rejected as a unit);
- wherein the conveyor arrangement is further adapted for inline conveying non-rejected container holders towards, through and from a second leak testing station, said second leak testing station comprising a second leak testing arrangement operationally connectable to a surrounding of each of said containers, an output signal of the second leak testing arrangement being decisive for unleakiness of each container.

Analogously to the corresponding method, this apparatus enables the rejection of grossly-leaking containers together with their corresponding container holder after being tested by the first leak testing arrangement (which would typically be a coarse leak detection arrangement for detecting grossly-leaking containers). Thereby, any product released from the interior of the leaking containers will be retained within the container holders and will not contaminate the environment of the first leak testing arrangement, preventing cross-contamination to other containers or container holders from causing contamination to reach the environment of the second leak testing arrangement (which would typically be a fine leak detection arrangement for detecting finely-leaking containers), thereby contaminating and compromising it.

In an embodiment of the apparatus, which may be combined with any subsequent embodiment of the apparatus unless in contradiction, the apparatus further comprises a second rejection mechanism operated based on an output of the second leak testing arrangement and arranged to reject container holders containing a container determined as leaky by the second leak testing arrangement. Thereby, easy segregation of container holders that may have been contaminated by a leaking container in the second leak detection step is achieved.

In an embodiment of the apparatus, which may be combined with any preceding or subsequent embodiment of the apparatus unless in contradiction, the apparatus further comprises an unloading arrangement downstream of the second leak testing station for unloading the containers from the container holders, and the second rejection mechanism is operated based on the output signal or the second leak testing arrangement for rejecting containers identified as leaky by the second leak testing arrangement. This results in a simple arrangement for rejection of leaking containers with minimal human intervention.

In an embodiment of the apparatus, which may be combined with any preceding or subsequent embodiment of the apparatus unless in contradiction, the apparatus further comprises an unloading arrangement for unloading containers rejected based on the first detection step from their corresponding container holders and the cleaning arrangement for cleaning said corresponding container holders. This cleaning apparatus can thus remove any contamination from the container holders and permits the re-use of the container holders.

In an embodiment of the apparatus, which may be combined with any preceding or subsequent embodiment of the apparatus unless in contradiction, wherein the unloading arrangement, which may be a combination of a plurality of smaller unloading mechanisms, is further adapted for unloading containers rejected based on the second detection step from their corresponding container holders and wherein the cleaning arrangement is further adapted for cleaning said corresponding container holders. This likewise permits cleaning off any contamination from container holders that may have been contaminated in the second leak testing station and permitting the re-use of the container holders concerned.

In an embodiment of the apparatus, which may be combined with any preceding or subsequent embodiment of the apparatus unless in contradiction, the container holders each comprise a holding volume for retaining product that may escape from the containers, preventing the leaking product from escaping from the container holders and contaminating testing equipment.

In an embodiment of the apparatus, which may be combined with any preceding or subsequent embodiment of the apparatus unless in contradiction, each container holder is adapted to contain a single container, resulting in simple and cheap container holders and enabling each container to be tested individually, thereby preventing non-leaking containers from being rejected together with leaking ones. Alternatively, each container holder is adapted to contain a plurality of containers, permitting parallel testing of multiple containers and thereby speeding testing throughput, however rejection of one leaking container entails rejection of all the containers in the same container holder, requiring disposal of all of these containers or intervention to identify which container or containers leaked.

In an embodiment of the apparatus, which may be combined with any preceding or subsequent embodiment of the apparatus unless in contradiction, the first leak detection arrangement comprises a pressure-course-based or impedance-based or laser-absorption-based leak detection arrangement, and the second leak detection arrangement comprises a mass-spectrometry-based leak detection arrangement. This permits the less sensitive pressure or impedance or laser absorption leak detection arrangement to protect the apparatus required for the extremely sensitive mass-spectrometry-based leak detection arrangement.

BRIEF DESCRIPTION OF DRAWINGS

The invention will now be illustrated by means of non-limiting exemplary embodiments in the attached figures, which show:

FIG. 1d—a selection of multiple container holders in plan view;

DETAILED DESCRIPTION OF EMBODIMENTS

Container holders are known in the industry as "pucks". They may either simply be holders for containers to be tested by a leak testing arrangement, or they may furthermore also form part of a test chamber for such a leak testing arrangement. In the former case, the container holder will be received completely inside a test chamber, whereas in the latter case the container holder itself forms part of the test chamber, a further test chamber section being brought into sealed contact with the container holder such that the test chamber is formed by the container holder and the further test chamber section.

Figure 1A:
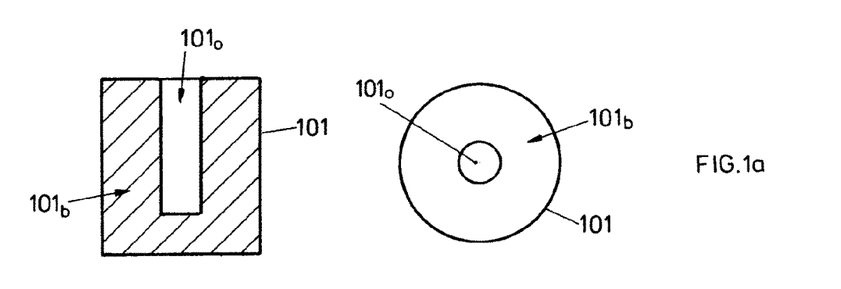
FIG. 1a-1c—a selection of container holders illustrated schematically in cross-section and plan view.
Figure 1B:
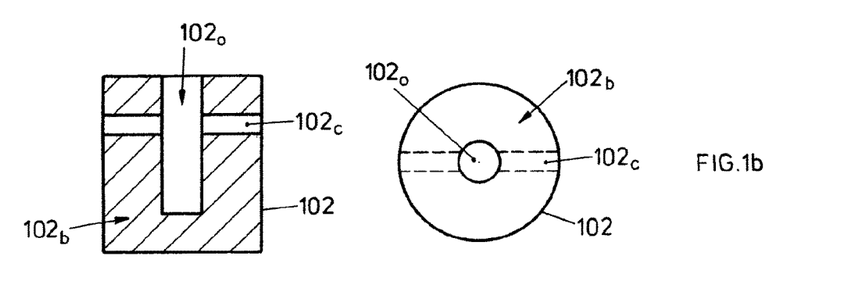
Figure 1C:
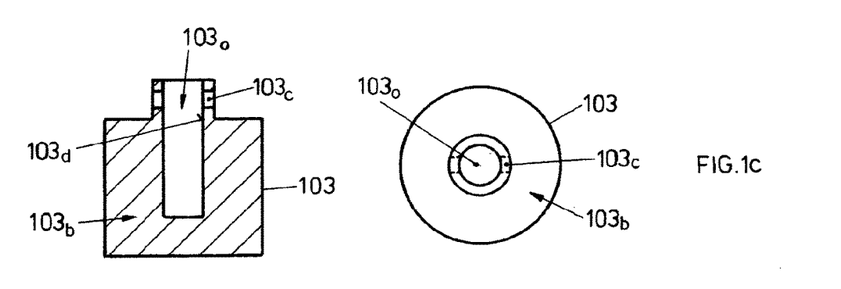

FIGS. 1a-1c provide several illustrations of shapes of container holders in cross-section and plan view. In FIG. 1a, container holder 101 illustrates a simple form of container holder, and comprises a container holder body $101_b$ provided with an opening $101_o$ for receiving a container (not illustrated). The container holder body $101_b$ may be cylindrical or any other convenient shape, and likewise the opening $101_o$ may likewise be of cylindrical cross-section, or of any other convenient cross-section.

In FIG. 1b, container holder 102 is similar to container holder 101, except that it further comprises a plurality of through holes $102_c$ which penetrate container holder body $102_b$ from the outer surface of the container holder 102 to the inner surface of the opening $102_a$. The purpose of these through-holes $102_c$ is to permit the equalization of pressure in the opening $102_o$ with that of a test chamber during a pressure-based leak test, and thereby to additionally expose the lower portion of a container being tested to the increased or decreased pressure in the test chamber.

In FIG. 1c, container holder 103 differs from the above-mentioned container holders 100 and 102 in that the body $103_b$ of container holder 103 is provided with an axial extension $103_d$ of smaller outer diameter than the container holder body $103_b$, and that through holes $103c$ are provided through the wall of axial extension $103_d$. Through holes $103d$ serve the same purpose as through holes $102_c$ as described above.

The exact form of the container holder 100 can easily be determined according to the desired application, and may be adapted to support a particular shape of container. Particularly, the shape of the opening $101_o$, $102_o$, $103_o$ may be conformed as desired to fit a particular container shape, and the blind end of the opening may be shaped so as to act as a reservoir to contain and retain any product that may leak out of a container during a leak testing step.

Figure 1D:
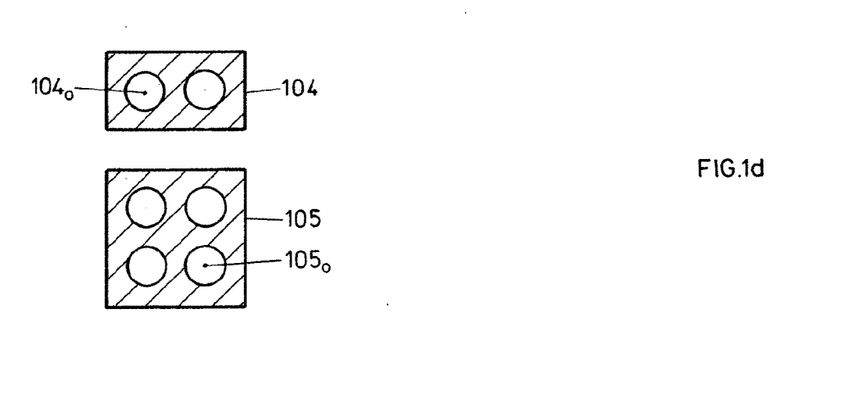

FIG. 1d illustrates a double container holder 104 and a quadruple container holder 105. Each opening $104_o$, $105_o$ respectively is adapted to receive a container, and may comprise through-holes with the same form and purpose as those illustrated in FIGS. 1c and 1d. This permits parallel testing of multiple containers, to increase the testing throughput rate. The exact number of cavities and the outer shape of the container holds 104, 105 can be chosen at will according to the requirements of the process operator.

Figure 2:
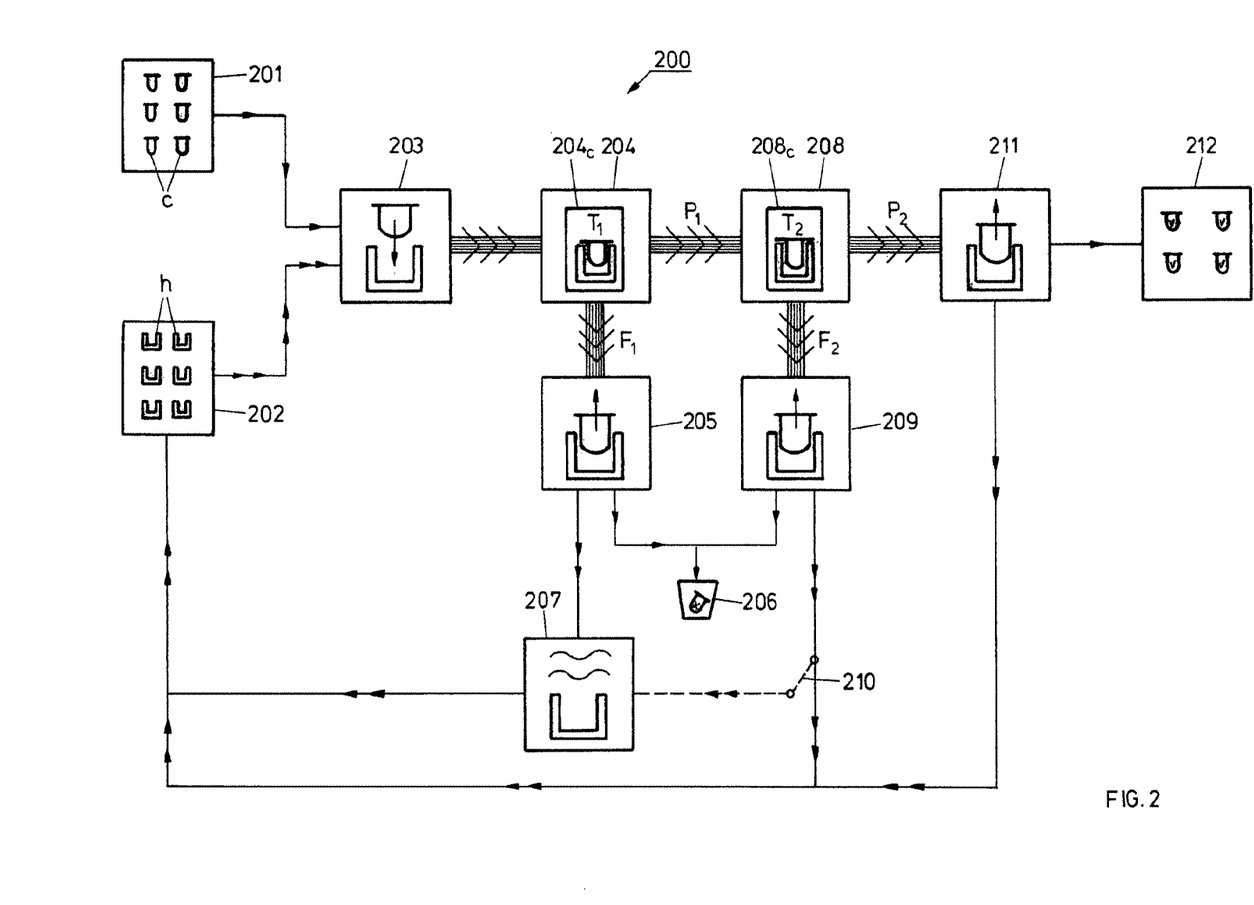
FIG. 2—a schematic block diagram of an embodiment of the invention.

FIG. 2 shows schematically as a block diagram a system 200 according to the invention adapted for carrying out a method according to the invention. Thin lines with single arrows illustrate the passage of containers, thin lines with double arrows illustrate the passage of container holders, and thick lines with triple arrows illustrate the passage of loaded container holders, i.e. a container holder containing a container. All of the above-mentioned lines indicate conveying paths that may be constituted by any known type of conveyor, e.g. a linear conveyor, an arcuate conveyor, a rotary conveyor, a robot, a carousel-type conveyor, and so on.

Filled containers c are supplied at 201, e.g. directly from a manufacturing line or from an intermediate storage. Container holders h are likewise supplied at 202, either from a magazine for storing the container holders h, or from a continuously circulating stream of container holders h. Containers c are loaded into container holders h at 203, and are conveyed to a first leak testing station 204 (which may comprise e.g. a plurality of test chambers on a rotary carousel arrangement), where the containers are subject to a first, coarse, leak test $T_1$ in a test chamber $204_c$, which may as previously discussed be either a unitary test chamber or a test chamber formed partly by container holder h and another test chamber component. This first leak test may for instance be a pressure-course method such as those disclosed in U.S. Pat. No. 5,907,093, U.S. Pat. No. 6,082,184, U.S. Pat. No. 6,202,477, U.S. Pat. No. 6,305,215, U.S. Pat. No. 6,439,033, U.S. Pat. No. 6,575,016, U.S. Pat. No. 6,829,936, U.S. Pat. No. 7,000,456 and further related patent documents by the same applicant, or may be an impedance-based method such as disclosed in U.S. Pat. No. 6,446,493 or U.S. Pat. No. 6,185,987, or may be a laser absorption method such as an infrared and/or visible-spectrum and/or ultraviolet laser absorption method. Based on the result of first leak detection test $T_1$, if the container tested is determined as leaking, a rejection mechanism (not illustrated) rejects the container together with its container holder h along pathway $F_1$. At 205, the rejected container is removed from its container holder h, either by hand or automatically. The leaking container c is then discarded at 206. The container holder h in question is likely to have become contaminated with product from inside the rejected container, and is thus subjected to cleaning at 207, which may be by hand or by machine. The thoroughly cleaned and dried container holder h is then returned to 202, i.e. is put into a container holder magazine or is returned to the circulating container holders h on a conveyor at an appropriate point. Since any contamination is restricted to the inside of the container holder h, cross contamination of subsequent containers and container holders is significantly reduced.

Containers c which have not been detected as leaking by first leak detection test $T_1$ are conveyed along path $P_1$ from first leak testing station 204 to second leak testing station 208 (which may likewise comprise e.g. a plurality of test chambers on a rotary carousel arrangement), in which they are subjected to a second, fine, leak detection test $T_2$ in a test chamber $208_c$, which may for instance be a mass-spectrometry-based test such as that disclosed in WO 2011/012730, or a mass-spectrometry-based test including a tracer such as helium, or any other fine leak-detection test.

Containers c determined as leaking by second leak detection test $T_2$ are rejected by a rejection mechanism (not illustrated), travel along path $F_2$, and are unloaded from the corresponding container holder h at 209, either automatically or by hand. As above, the rejected containers c are disposed of at 206. Container holders may either be directly returned to 202, i.e. they are put into a container holder magazine or are returned to the circulating container holders h on a conveyor at an appropriate point, or may optionally be directed for cleaning at 207 as above via optional switch 210.

Containers c not determined as leaking by second leak test $T_2$ are considered as being unleaky and are unloaded from the container holders h at 211, and then transported for further processing, packaging etc at 212. Empty container holders h are then returned to 202, i.e. are put into a container holder magazine or are returned to the circulating container holders h on a conveyor at an appropriate point.

Figure 3:
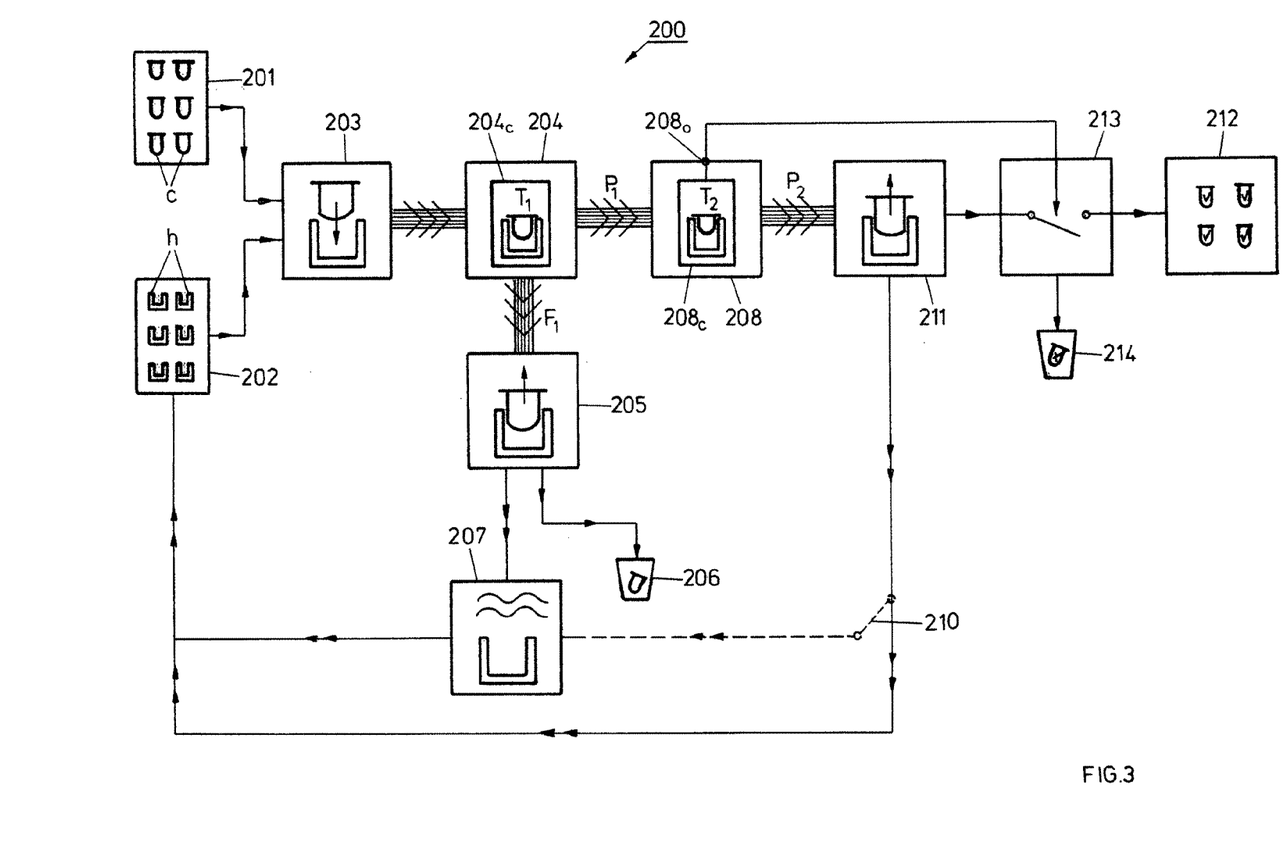
FIG. 3—a schematic block diagram of a further embodiment of the invention.

FIG. 3 shows schematically as a block diagram a further variation of a system 200 according to the invention adapted for carrying out a method according to the invention. Blocks 201-207 are identical to those of FIG. 2, thus need not be discussed further. The second leak testing station 208 performs second leak detection test $T_2$ as above, however in this embodiment the container holders are not rejected directly after performing second leak detection test $T_2$. In this embodiment, all containers are transported along path $P_2$ and are unloaded at 211. Container holders h are directly returned to 202, i.e. are put into a container holder magazine or are returned to the circulating container holders h on a conveyor at an appropriate point, or may optionally be directed for cleaning at 207 as above via optional switch 210 if required.

After being unloaded at 211, containers c are transported to rejection mechanism 213, which is controlled based on output $208_o$ of second leak detection test $T_2$ in second leak detection station 208. Leak detection test $T_2$ allocates a result of detecting a leak to the corresponding container, and controls rejection mechanism 213 accordingly so as to reject the leaking container such that it can be disposed at 214. Non-rejected containers c are then transported for further processing, packaging etc at 212.

In both of the embodiments of FIG. 2 and FIG. 3, alternatively multiple container holders h such as those illustrated in FIG. 1d may be utilised for parallel testing of containers, either in a common test chamber or in a plurality of parallel test chambers. In this case, if at least one container in a container holder is detected as leaking in first leak detection test $T_1$ in block 204, then the container holder and all the containers contained therein are rejected along pathway $F_1$, all of the containers are removed from the container holder h, and at least the leaky container is discarded, if it is identifiable. If not, all the containers are discarded.

Likewise, if at least one container in a container holder h is detected as leaking in second leak detection test $T_2$, at least the leaking container is rejected and discarded if it can be identified, otherwise all the containers from the container holder h in question are rejected and discarded.

Figure 4:
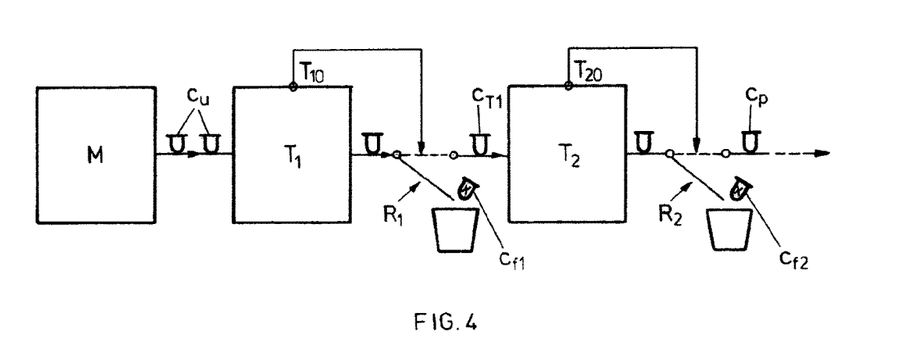
FIG. 4—schematically and generically a diagram of manufacturing unleaky containers according to the invention.

FIG. 4 shows schematically and generically a system for manufacturing unleaky containers: note that for clarity and simplicity container holders are not illustrated. In block M, containers are manufactured and filled, producing untested containers $c_u$. These untested containers $c_u$ are then passed to block $T_1$, where they are subject to a first (coarse) leak detection test. Coarsely leaking containers $c_{f1}$ are rejected by first rejection mechanism $R_1$ based on output of the first leak detection system output at $T_{1o}$. Rejection mechanism $R_1$ may also be incorporated into block $T_1$. Containers $c_{T1}$ not rejected based on output of the first leak detection system output at $T_{1o}$ are then passed to block $T_2$, where they are subject to a second (fine) leak detection test. Finely-leaking containers $c_{f2}$ are rejected by second rejection mechanism $R_2$ based on output of the second leak detection system output at $T_{2o}$. Rejection mechanism $R_2$ may also be incorporated into block $T_2$.

Unleaky containers $c_p$, having passed the complete leak detection test, are thus considered manufactured and are then passed on for further processing such as further filling if necessary, application of labels, boxing, shipping to customers and so on.

While a full attempt has been made to describe the invention by means of various specific embodiments, these are not to be construed as limiting the scope of the invention, which is defined solely by the scope of the appended claims. In particular, it is noted that all embodiments may be combined as long as the result is not contradictory.

The invention claimed is:

1. A method of leak testing closed, filled containers comprising:
   loading containers into corresponding container holders, each container holder being adapted to receive a single container;
   conveying, on a conveyor, the containers in the respective corresponding container holders to a first leak testing station including a first leak testing arrangement;
   subjecting the containers in the respective corresponding container holders to a first leak detection step, and rejecting together with their corresponding container holders containers identified as leaking based on the first leak detection step;
   conveying, on the conveyor, the containers not identified as leaking in the first leak detection step in the respective corresponding container holders to a second leak testing station including a second leak testing arrangement; and
   subjecting the containers not identified as leaking in the first leak detection step in their container holders to a second leak detection step, wherein
      the container holders are configured to be removable from the conveyor by the first leak testing arrangement and the second leak testing arrangement.

2. The method according to claim 1, further comprising:
   rejecting containers identified as leaking in the second leak detection step in their corresponding container holders.

3. The method according to claim 1, further comprising:
unloading containers subjected to the second leak detection step from the container holders, and then
rejecting unloaded containers identified as leaking in the second leak detection step.

4. The method according to claim 1, further comprising:
unloading containers rejected based on the first leak detection step from their corresponding container holders, and cleaning the corresponding container holders; and
cleaning the container holders rejected based on the second leak detection step.

5. The method according to the claim 4, wherein the cleaned container holders are reused.

6. The method according to claim 1, further comprising retaining within the container holders any product escaping from a container during the first leak detection step.

7. The method according to claim 1, wherein:
the first leak detection step is selected from a group consisting of: a pressure-course-based leak detection step, an impedance-based leak detection step and a laser-absorption-based leak detection step, and
the second leak detection step is a mass-spectrometry-based leak detection step.

8. A method of manufacturing unleaky closed containers filled with a product, the method comprising:
manufacturing untested filled containers;
testing the containers by the method of claim 1; and
accepting containers which have not been identified as leaking as being unleaky containers.

9. An apparatus for leak testing closed and filled containers comprising:
a loading arrangement for loading containers into container holders, each container holder being adapted to contain a single container;
a first leak testing station;
a conveyor arrangement for inline conveying a plurality of the container holders towards, through and from the first leak testing station, the first leak testing station including a first leak testing arrangement operationally connectable to a surrounding of each of the containers;
a first rejection mechanism operated based on an output of the first leak testing arrangement and arranged to reject container holders containing a container determined as leaking by the first leak testing arrangement; and
a second leak testing station, wherein:
the conveyor arrangement is further adapted for inline conveying non-rejected container holders towards, through and from the second leak testing station, the second leak testing station including a second leak testing arrangement operationally connectable to the surrounding of each of the containers, an output signal of the second leak testing arrangement being decisive for unleakiness of each respective container; and
the container holders are configured to be removable from the conveyor arrangement by the first leak testing arrangement and the second leak testing arrangement.

10. The apparatus according to claim 9, further comprising a second rejection mechanism operated based on an output of the second leak testing arrangement and arranged to reject container holders containing a container determined as leaky by the second leak testing arrangement.

11. The apparatus according to claim 9, further comprising:
a second unloading arrangement downstream of the second leak testing station for unloading the containers from the container holders, and
a second rejection mechanism operated based on the output signal of the second leak testing arrangement for rejecting containers identified as leaky by the second leak testing arrangement.

12. The apparatus according to claim 9, further comprising a first unloading arrangement for unloading containers rejected based on a first detection step from their corresponding container holders and a cleaning arrangement for cleaning the corresponding container holders.

13. The apparatus according to claim 12, wherein:
the first unloading arrangement is further adapted for unloading containers rejected based on a second detection step from their corresponding container holders, and
the cleaning arrangement is further adapted for cleaning the corresponding container holders.

14. The apparatus according to claim 9, wherein the container holders each include a holding volume for retaining product that escapes from the containers.

15. The apparatus according to claim 9, wherein:
the first leak testing arrangement is selected from a group consisting of: a pressure-course-based leak detection arrangement, an impedance-based leak detection arrangement, and a laser-absorption based leak detection arrangement, and
the second leak testing arrangement comprises a mass-spectrometry-based leak detection arrangement.

* * * * *